(No Model.)
J. C. BIOREN.
SAFETY CUFF BUTTON LINK.
No. 477,349. Patented June 21, 1892.
Fig. 1.
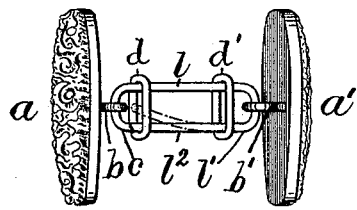
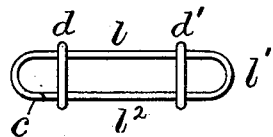
Fig. 2.
Attest
J. Van Est Jr.
Edw. F. Kinsey
Inventor.
James C. Bioren, per
Crane & Miller, Attys.

UNITED STATES PATENT OFFICE.

JAMES C. BIOREN, OF NEWARK, NEW JERSEY.

SAFETY CUFF-BUTTON LINK.

SPECIFICATION forming part of Letters Patent No. 477,349, dated June 21, 1892.

Application filed February 19, 1892. Serial No. 422,068. (No model.)

*To all whom it may concern:*

Be it known that I, JAMES C. BIOREN, a citizen of the United States, residing at Newark, Essex county, New Jersey, have invented certain new and useful Improvements in Safety Cuff-Button Links, fully described and represented in the following specification and the accompanying drawings, forming a part of the same.

This invention relates to that class of buttons for fastening together the ends of cuffs and known as "link" buttons; and the object of the improvement is to provide a means of fastening the button-heads which shall be neat in appearance and adapted to lock the button-heads from accidental detachment.

The invention consists, essentially, in a link comprising a rigid hook with a shank having a reflex bend therein to form an elastic latch-arm opposed to the hook and a guide-loop secured to the said shank to prevent the lateral displacement of the latch-arm.

In the annexed drawings, Figure 1 is an oblique view of a link cuff-button embodying my improvement, and Fig. 2 is a side view of the link detached.

The button-heads $a$ $a'$ are provided with eyes $b$ $b'$ in the usual manner, and are connected together by means of the link. The latter is formed of elastic wire, and comprises the hook $c$, the shank $l$, having the reflex bend $l'$ to form the flexible latch-arm $l^2$, with its free end opposed to and in a line with the end of the hook $c$, and the guide-loop $d$, secured rigidly to the shank of the hook adjacent to the extremity of and inclosing the latch-arm $l^2$.

As indicated in the drawings, the guide-loop $d$ is preferably secured to the rigid side of the link (marked $l$) in order to serve, also, as a guard to protect the latch-arm from accidental depression, as shown in dotted lines in Fig. 1, thereby releasing the button-head and allowing it to slip off the hook; but it is evident that the guide-loop may be secured to the free end $l^2$ of the shank, which constitutes the latch-arm, and still serve the purpose of a guide to prevent the lateral displacement of the latch-arm. This guide-loop serves, also, to confine the eye of the head $a$ within the hook $c$, as does the loop or crossbar $d'$ near the opposite end of the link to hold the button-head $b'$ within the bend $l'$.

Having thus set forth the nature of the invention, what I claim herein, and desire to secure by Letters Patent, is—

1. A link for fastening together the eyes of buttons, consisting in a rigid hook provided with a shank with a reflex bend to form an elastic arm having its free end opposed to and in a line with the extremity of the hook, and a guide-loop secured to the said shank and arranged adjacent to and inclosing the free end of the same, substantially as and for the purpose set forth.

2. The combination, with the button-heads provided with suitable eyes, as described, of the link consisting in the hook $c$, the shank $l$ with reflex bend $l'$ to form the elastic latch-arm $l^2$, having its free end opposed to and in a line with the extremity of the hook, and the guide-loop $d$, inclosing the said latch-arm and secured to the rigid portion of the shank adjacent to the hook, as and for the purpose set forth.

3. The combination, with the button-heads provided with suitable eyes, as described, of the link consisting in the hook $c$, the shank $l$ with reflex bend $l'$ to form the elastic latch-arm $l^2$, opposed to the hook, and the loops $d$ and $d'$, secured to the said shank, as and for the purpose set forth.

In testimony whereof I have hereunto set my hand in the presence of two subscribing witnesses.

JAMES C. BIOREN.

Witnesses:
HENRY J. MILLER,
J. VAN NEST, Jr.